United States Patent [19]

Clendening

[11] Patent Number: 4,782,499
[45] Date of Patent: Nov. 1, 1988

[54] AUTOMATIC ALIGNMENT OF A SYNCHRONOUS DATA SYSTEM USING A LOCAL REFERENCE CLOCK AND EXTERNAL CLOCK WITH AN UNKNOWN DELAY BETWEEN THE TWO CLOCKS

[75] Inventor: Steven J. Clendening, McKinney, Tex.

[73] Assignee: Rockwell International Corporation, El Segundo, Calif.

[21] Appl. No.: 912,292

[22] Filed: Sep. 29, 1986

[51] Int. Cl.$^4$ .............................................. H04L 7/06
[52] U.S. Cl. .................... 375/113; 375/107; 375/111; 375/118; 340/825.2
[58] Field of Search ............... 375/107, 108, 111, 118, 375/119, 113; 371/47; 340/825.14, 825.2

[56] References Cited

U.S. PATENT DOCUMENTS 4,651,103 3/1987 Grimes ............................ 375/108 X Primary Examiner—A. D. Pellinen
Assistant Examiner—Derek S. Jennings
Attorney, Agent, or Firm—Bruce C. Lutz; V. L. Sewell; H. Fredrick Hamann

[57] ABSTRACT

An alignment circuit for use in a synchronous data transfer system for logically comparing the phase of a returned clock signal having an unknown phase relative to a local clock such that the local clock or its inverse can be used to retime returned remote data without the possibility of generating errors due to the lack of set-up time and hold time requirements for actuating a D flip-flop gate at its clock input with respect to the data arriving a the D input of the D flip-flop. The phase of the local clock relative to the return clock is detected and compared with a threshold phase shift value. If the phase shift is negligible, the remote data is clocked by the inverted local clock. If the phase shift exceeds the threshold value, the remote data is clocked by the local clock.

6 Claims, 3 Drawing Sheets

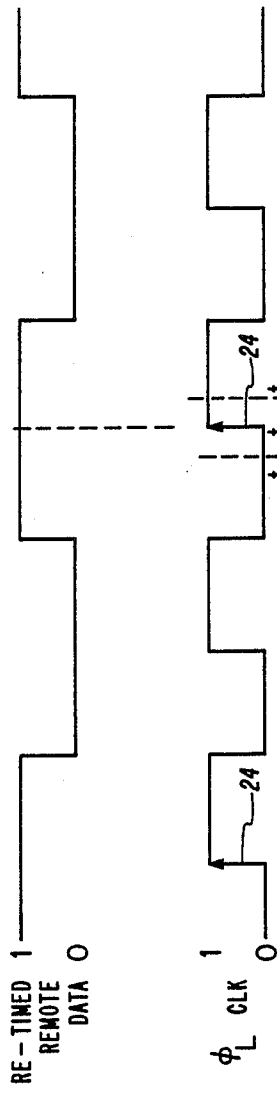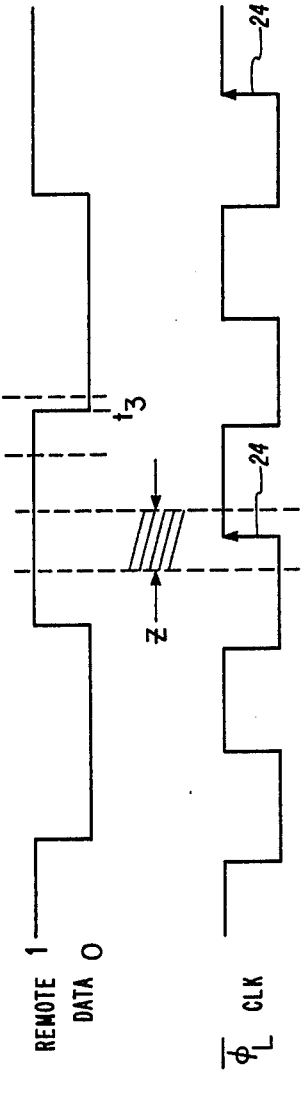

AUTOMATIC ALIGNMENT OF A SYNCHRONOUS DATA SYSTEM USING A LOCAL REFERENCE CLOCK AND EXTERNAL CLOCK WITH AN UNKNOWN DELAY BETWEEN THE TWO CLOCKS

FIELD OF THE INVENTION

This invention relates generally to synchronous data transfer between first and second circuits, and in particular to a synchronous data system in which a remote data source is separated from a local clock by an unknown static distance.

BACKGROUND OF THE INVENTION

In data processing systems, data signals may be input into a central processor from multiple sources. In such systems it is necessary to synchronize the transfer of data with respect to a common clock, referred to as a master local oscillator. In some instances, it may be desirable or expedient to locate a data source remotely with respect to the central processor and local clock. Any time that such a system is operated synchronously and the remote data source is separated from the local clock by an unknown distance, the phase of the returning data relative to the local clock is shifted because of the transmission delay induced by the physical length of the signal conductors. The phase shift of the data signal relative to the local clock can be great enough in some instances to cause a violation of the set-up and hold time requirements of local logic circuits.

In some low-frequency circuits, the phase variation of data bits relative to a local clock oscillator is not significant, especially for short-run cable installations. However, as the frequency of data transfer increases, and in particular if cable lengths between remote and local circuits are great enough or are subject to conditions which induce phase variations, means are required for maintaining the clock frequency of the remote data source tied to the frequency of the local clock, with provisions for insuring that the data is clocked by the local clock within a specified window such that bit errors do not occur due to violation of set-up time and hold time specifications of local logic circuits.

The foregoing considerations are particularly critical when a flip-flop is used to retime data. In such an operation, there is a certain period of time during which the data signal must remain stable relative to the rising clock edge input to establish an accurately retimed output. For instance, the data signal must have assumed a logic one value for a certain amount of time prior to the onset of the clock rising edge and must maintain the logic one value and not transition to a logic zero for a certain period of time after the rising clock signal has achieved logic one value. This range of time with respect to the rising clock edge is referred to as the "not allowed time". The foregoing clock/data timing constraints must be observed to obtain a valid data synchronization so that the output data signal is a faithful and accurate representation of the input data signal.

DESCRIPTION OF THE PRIOR ART

One synchronizing method used in the prior art is to transmit a clock signal from a local source to the remote circuit for clocking the remote data signal. Both the data signal and the clock at the remote source are returned to the local circuitry, thus requiring three transmission lines. Both the return clock and the return data transmission lines should be of substantially identical length, otherwise temperature and other parameters could cause timing problems. In such a situation, the return clock is then used in the local circuit for further data processing. Such an arrangement, however, is subject to phase variations induced by temperature, voltage fluctuations and circuit component aging which may cause variable transmission time delays between the remote data source and the local circuit.

Another approach which eliminates the use of a return clock is a phase-locked loop in which the phase difference between a local master oscillator and the return data is detected and is used to produce a clock signal which is continuously and automatically centered relative to incoming data. One such phase-locked system utilizes a voltage-controlled oscillator for continuously adjusting the local master clock relative to the incoming data. Such an arrangement, while generally effective, is somewhat temperature sensitive and requires complex circuitry.

There is a continuing interest in improving synchronous data transfer systems, particularly for high rates of synchronous data transfer, and in view of the inherent phase shifts associated with remotely-located data sources.

OBJECTS OF THE INVENTION

Accordingly, it is an object of the present invention to provide an improved data synchronizing circuit.

Another object of the invention is to provide a simplified data synchronizing circuit having fewer components for synchronizing remote data with respect to a local clock in a remote data/local clock system in which a phase variation may be induced primarily by transmission time delays.

Another object of this invention is to provide a circuit for clocking a remote data source and automatically adjusting the timing relationship of the remote data with respect to a local clock in a synchronous data transfer system.

Yet another object of the invention is to provide a circuit for retiming remote data while avoiding the generation of timing errors due to violation of set-up time and hold time requirements of local logic circuits.

Still another object of the invention is to provide a retiming circuit for automatically adjusting the phase of a remote data signal with respect to the rising edge of a local clock signal, whereby the remote data input to the logic circuit is constrained to assume a predetermined value, either logic one or logic zero, for a predetermined amount of time prior to the clock rising edge, and with the remote data logic value being stable for a predetermined time after the rising edge of the clock signal.

SUMMARY OF THE INVENTION

The foregoing objects are achieved according to the present invention in which a clock signal from a local master oscillator is applied via a signal conductor to a remote circuit for clocking a remote data signal. The remote data signal and the clock at the remote data source are returned via signal conductors to the local circuitry, thus requiring three transmission lines. The phase of the return clock is compared with the phase of the local clock utilizing an exclusive-OR gate to determine if a timing conflict exists with respect to the remote data signal. The output of the first exclusive-OR phase comparator is integrated and is applied to the inverting input of a threshold detector.

The magnitude of the integrated phase comparator output is compared with a predetermined threshold value which corresponds with an excessive phase shift condition of the remote data relative to the local clock. The output of the voltage comparator forms a first input of a second exclusive-OR gate, with the local clock signal being applied as a second input of the second exclusive-OR gate.

In the absence of a conflict situation, the output of the voltage comparator is at a logic high value, and the exclusive-OR gate inverts the local clock signal. The inverted local clock signal is applied to a first D flip-flop for gating the remote data to a second D flip-flop which is in turn gated by the local clock.

In the event of an excessive phase shift condition, the output of the integrator rises above the threshold value and causes the threshold detector to switch to logic low condition, which is applied as one input to the second exclusive-OR gate. With the logic low signal as one input, the exclusive-OR gate functions as a buffer for the local clock signal, with the remote data being clocked sequentially by the buffered output of the exclusive-OR gate in a first D flip-flop, and then by the local clock in a second D flip-flop.

According to the foregoing arrangement, the remote data signal is automatically retimed with respect to the local clock, and the value of the remote data signal is at a stable logic condition for predetermined periods prior to and following the rising edge of the local clock. That is, the remote data signal is automatically positioned relative to the local clock to prevent violation of set-up time and hold time requirements of the local D flip-flop retiming circuit.

Operational features and advantages of the present invention will be appreciated by those skilled in the art upon reading the detailed description which follows in connection with the attached drawings.

BRIEF DESCRIPTION OF THE DRAWINGS

FIG. 2 is a timing diagram of the retimed remote data waveform;

FIG. 3 is a timing diagram of the local clock waveform;

FIG. 4 is a timing diagram of the remote data waveform;

FIG. 5 is a timing diagram of the inverted local clock waveform; and,

DETAILED DESCRIPTION OF THE PREFERRED EMBODIMENT

Figure 1:
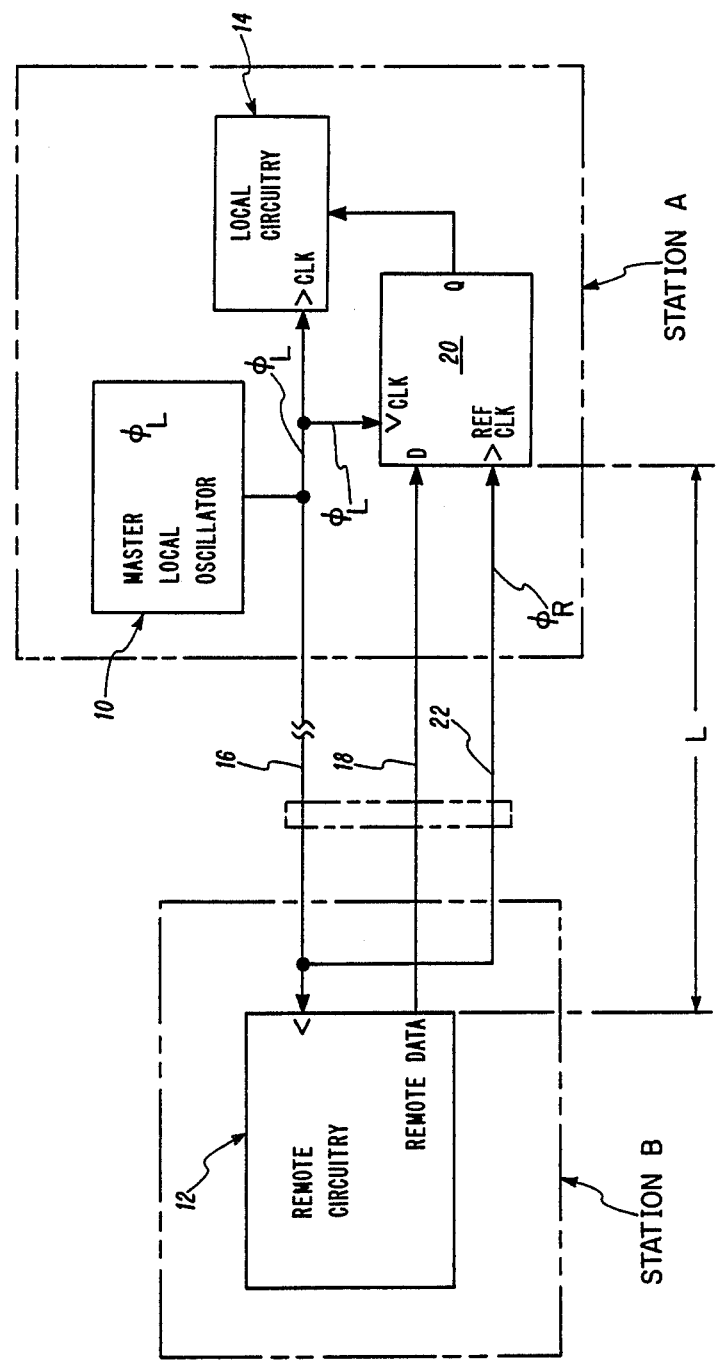
FIG. 1 is a simplified block diagram in which the present invention is shown in combination with local circuitry and remote circuitry.

In the description which follows, like parts are indicated throughout the specification and drawings with the same reference numerals, respectively.

Referring now to FIG. 1 of the drawing, a master local oscillator 10 supplies a local clock signal $\phi_L$ for synchronizing the transfer of data from a remote circuit 12 to a local circuit 14. The local clock signal $\phi_L$ is conducted via a signal conductor 16 having an unknown static length L. The master local oscillator 10 and local circuitry 14 are situated at Station A, and the remote circuitry 12 is situated at Station B, which is located at an unknown static distance L with respect to Station A. A remote data signal REMOTE DATA is conducted via a signal conductor 18 from the remote circuitry 12 of Station B to a retiming circuit 20 at Station A.

It will be appreciated that an excessive phase shift of the REMOTE DATA signal with respect to the local clock $\phi_L$ may be caused by the propagation delay associated with the unknown static length L of the remote data signal conductor 18. Before the REMOTE DATA signal can be processed by the local circuitry 14, it must be clocked synchronously with the $\phi_L$ clock generated by the master local oscillator 10. Because of the propagation delays associated with the signal conductors 16, 18, the REMOTE DATA signal as it reaches Station A may have an unacceptable phase shift with respect to the local clock $\phi_L$. This phase shift may in some cases be great enough to cause a violation of the set-up time and hold time requirements of the logic gate circuits in the local circuitry 14.

According to the retiming arrangement of this invention, a return clock signal $\phi_R$ is conducted via a signal conductor 22 from the remote circuitry 12 at Station B to a retiming circuit 20 at Station A across the unknown static distance L. The return clock $\phi_R$ is compared with the local clock $\phi_L$ to determine the phase variation.

Since the retiming of the remote data is referenced to the local clock $\phi_L$, the phase of the local clock $\phi_L$ and relative to the return clock signal $\phi_R$ will provide an indication as to whether the phase difference is not excessive and that the present phase of the local clock $\phi_L$ may be used for gating the REMOTE DATA, or alternatively, that the phase difference is excessive and the inverted local clock $\phi_L$ should be used in conjunction with the local clock $\phi_L$ to gate the retimed REMOTE DATA to the local circuitry 14.

The purpose of the retiming circuit 20 is to retime the remote data signal with respect to the local clock $\phi_L$ to insure that the remote data signal has a stable logic value relative to the rising edge of clock signal $\phi_L$ being applied to a flip-flop does not violate the set-up time and hold time requirements in order to establish an accurately timed output. That is, the retiming circuit 20 must effectively shift the REMOTE DATA signal relative to the local clock $\phi_L$ so that the rising clock edge occurs at a time when the logic condition of the remote data signal has been stable for a predetermined length of time and which remains stable at the logic condition for a predetermined length of time after the rising edge of clock signal $\phi_L$.

Referring to FIGS. 2, 3, 4 and 5, the foregoing timing relationships are illustrated. The REMOTE DATA waveform of FIG. 4 relative to the local clock $\phi_L$ waveform of FIG. 3 illustrates violation of the set-up time and hold time requirements. In particular, the rising edge 24 of clock signal $\phi_L$ occurs at a time to when the logic one value of the remote data signal has "pre-edge stability". The "not allowed zone" Z is the interval between the time t1 prior to the rising edge 24 of the $\phi_L$ clock, to the time t2 following the occurrence of the $\phi_L$ rising edge 24. The specific time values are a function of the logic circuit technology, e.g. CMOS, TTL, ECL, and the actual switching speed of the logic circuits. Generally, the faster switching times require smaller exclusion zones.

However, as shown in FIG. 4, the signal REMOTE DATA transitions at t3 within the "not allowed zone" Z from a logic one condition to a logic zero condition, and therefore violates the set-up time and hold time requirements of the local logic circuits. Bit errors would occur in response to the gating of REMOTE DATA within the "not allowed zone" Z.

Figure 6:
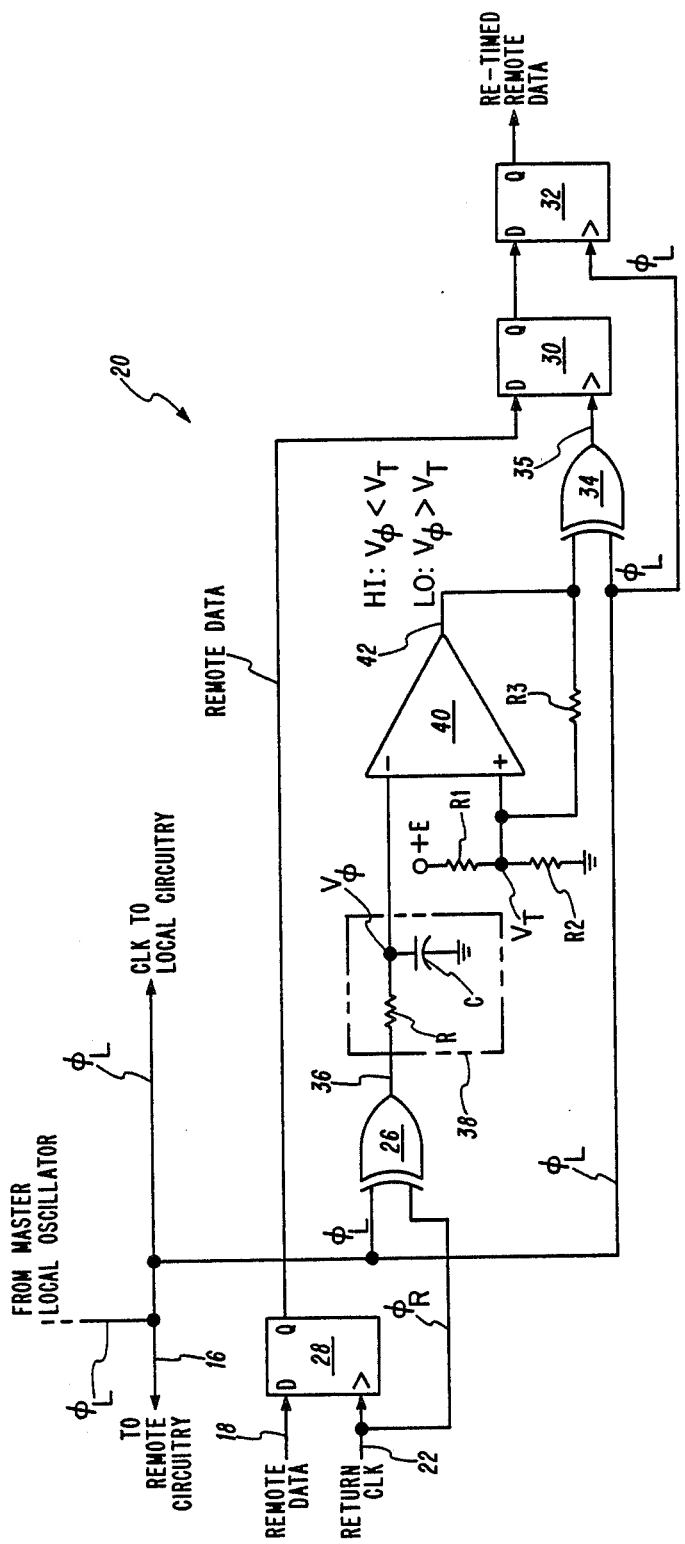
FIG. 6 is a simplified block diagram of the remote data retiming circuit of the present invention.

Shifting of the REMOTE DATA signal relative to the local clock $\phi_L$ is carried out by the retiming circuitry 20 of FIG. 6 to accomodate the skewed REMOTE DATA signal situation as illustrated in FIG. 4. When the phase shift is excessive, the retiming circuit 20 causes the REMOTE DATA signal to be retimed relative to the local clock signal $\phi_L$, with the retimed REMOTE DATA waveform of FIG. 2 being properly positioned with respect to the local clock $\phi_L$ so that the set-up time and hold time requirements are satisfied.

For a situation in which the phase difference between the local clock $\phi_L$ and the return clock $\phi_R$ is negligible, the REMOTE DATA signal is gated by the inverted clock $\overline{\phi}_L$ as illustrated in FIGS. 4 and 5. Note that the rising edge 24 of the inverted local clock $\overline{\phi}_L$ is properly positioned with respect to stable logic one value of the REMOTE DATA signal so that valid gating is accomplished.

Referring now to FIG. 6, the local clock signal $\phi_L$ and the return clock signal $\phi_R$ are compared in an exclusive-OR gate 26 to determine the existence of a timing conflict of the REMOTE DATA signal relative to the local clock $\phi_L$. The REMOTE DATA signal is applied to the D input of a D flip-flop, while the return clock signal $\phi_R$ is applied to the clock terminal (>). The REMOTE DATA signal is sequentially gated through the first D flip-flop 28, a second D flip-flop 30 and a third D flip-flop 32. The REMOTE DATA signal is initially clocked by the return clock signal $\phi_R$ in D flip-flop 28, and is thereafter clocked by the exclusive-OR gate 34 through D flip-flops 30 and by $\phi_L$ through D flip-flop 32.

Upon the occurrence of a REMOTE DATA phase variation situation as illustrated in FIG. 4, it is necessary to retime the REMOTE DATA signal whereby a stable logic condition is maintained sufficiently before and after the rising clock edge 24 of the $\phi_L$ local clock. According to the present invention, the exclusive-OR gate 26 compares the phase of the local clock $\phi_L$ and the return clock $\phi_R$ to determine if an excessive phase variation exists between the local clock and the REMOTE DATA signal. If a timing conflict is detected, the second exclusive-OR gate 34 inverts the local clock and gates the REMOTE DATA signal with $\phi_L$ to eliminate the conflict.

As can be seen in FIG. 6, the output 36 of exclusive-OR gate 26 is logic high when a phase difference exists between $\phi_L$ and $\phi_R$, and is logic low when no phase difference exists. That is, when one input is high and the other is low, the gate output 36 is high, but when both inputs are low or both inputs are high, the gate output 36 is low.

The output 36 of exclusive-OR gate 26 forms an input to an integrator circuit 38 which comprises a resistor R and a capacitor C. A voltage $V_\phi$ appears at the output of the integrator according to the phase difference of the $\phi_L$ and $\phi_R$ clocks at the input to the exclusive-OR gate 26. The voltage $V_\phi$ is applied to the inverting input (−) of a threshold detector 40. The non-inverting input (+) of the threshold detector 40 is connected to a voltage divider circuit formed by resistors R1, R2 and R3. Resistor R1 is connected to a voltage +E, and resistor R2 is connected to ground. The feedback resistor R3 is connected between the output terminal 42 of the threshold detector 40 and the voltage node $V_T$.

The magnitude of the voltage $V_\phi$ is compared with the predetermined threshold voltage $V_T$ which corresponds with a predetermined excessive phase shift condition of the REMOTE DATA relative to the local clock $\phi_L$. In the absence of a conflict situation, the output 42 of the threshold detector 40 is at logic high value, and the exclusive-OR gate 34 inverts the local clock signal $\phi_L$ to produce an inverted clock $\overline{\phi}_L$ at its output 35. The inverted clock signal $\overline{\phi}_L$ is applied to the clock terminal (>) of the D flip-flop 30 for gating the RFMOTF DATA signal to the D flip-flop 32 which is in turn gated by the local clock $\phi_L$. This situation corresponds with $\phi_L$ and $\phi_R$ being substantially coincident, or with only a negligible phase shift occurring.

For the foregoing situation, the voltage $V_\phi$ is less than $V_T$ and the output 42 of the threshold detector 40 is at logic high level. This logic high level is applied to an input of the exclusive-OR gate 34, which produces the inverted $\overline{\phi}_L$ signal at its output 35. The REMOTE DATA signal appearing at the D input of D flip-flop 30 is thus triggered by the rising edge 24 of the inverted clock signal $\overline{\phi}_L$. The REMOTE DATA signal is conducted to the Q output terminal of D flip-flop 30 and appears simultaneously at the D input terminal of D flip-flop 32, and is thereafter gated by the rising edge 24 of the local clock $\phi_L$.

In the event of an excessive phase shift condition of the remote data relative to the local clock, the output voltage $V_\phi$ of the integrator circuit 38 rises above the threshold value $V_T$ and causes the threshold detector 40 to switch to a logic low condition. This logic low condition is applied as one input to the exclusive-OR gate 34. For the excessive phase shift situation, the exclusive-OR gate 34 functions as a buffer for the local clock $\phi_L$, with the REMOTE DATA signal being clocked simultaneously by D flip-flop 30 in response to the buffered $\phi_L$ output of the exclusive-OR gate 34 and by the local clock $\phi_L$ which is applied simultaneously to the D flip-flop 32.

According the foregoing arrangement, the REMOTE DATA signal is automatically retimed with respect to the local clock $\phi_L$ to insure that the value of the REMOTE DATA signal is at a stable logic one condition for a predetermined time at least greater than ($t_0-t_1$) prior to the occurrence ($t_0$) of the rising edge 24 of the local clock $\phi_L$, and which remains stable at the logic one condition for a time at least exceeding ($t_2 - t_0$) following the occurrence of the rising edge 24 of the local clock $\phi_L$. According to this arrangement, the REMOTE DATA signal is automatically positioned relative to the local clock signal $\phi_L$ to prevent violation of set-up time and hold time requirements of the local D flip-flop logic gates.

That is, when the local clock $\phi_L$ and the return clock $\phi_R$ are exactly in phase or if the phase difference is negligible, the output of the threshold detector 40 is logic high and the exclusive-OR gate 34 functions as an inverter with the result that the remote data signal is clocked by the inverted clock $\overline{\phi}_L$ in the D flip-flop 30. The remote data signal is thereafter sequentially clocked by the local clock $\phi_L$ in D flip-flop 32.

In an excessive phase shift situation, that is $\phi_R$ is delayed with respect to $\phi_L$ by an unacceptable amount, the output 42 of the threshold comparator 40 transitions to logic low, with the result that the exclusive-OR gate 34 functions as a buffer, with its $\phi_L$ input appearing as its output and applied to the clock input (<) of D flip-flop 30. In this arrangement, the REMOTE DATA signal is clocked simultaneously through D flip-flops 30, 32 each time $\phi_L$ transitions from logic low to logic high.

As seen in FIG. 2, the RETIMED REMOTE DATA is shifted relative to the local clock $\phi_L$ so that the remote data assumes a logic high condition on both sides of the "not allowed zone" Z.

Feedback resistor R3 introduces a hysteresis effect in the operation of the threshold detector 40. That is, when the output of threshold detector 40 is high ($V_\phi < V_T$), the voltage $V_T$ assumes a first value V1 which is greater than the corresponding voltage produced when the output of threshold detector 40 is low ($V_\phi > V_T$). The purpose of the feedback resistor R3 is to clean up the switching action and avoid oscillation for operation near the threshold value $V_T$.

According to the foregoing arrangement, the local clock signal $\phi_L$ is inverted to eliminate timing problems with returning REMOTE DATA when a phase variation of the return clock $\phi_R$ relative to the local clock $\phi_L$ is detected. If a significant phase variation is detected, the returning REMOTE DATA signal is retimed and is clocked by the $\phi_L$ clock to insure that the data signal assumes a stable logic condition immediately before and after the "not allowed zone" Z.

Although the invention has been described with reference to a specific embodiment, and with reference to a specific local/remote situation, the foregoing description is not intended to be construed in a limiting sense. Various modifications of the disclosed embodiment as well as alternative applications of the invention will be suggested to persons skilled in the art by the foregoing specification and illustration. For example, the automatic alignment circuit of the present invention can be used to good advantage in connection with a data transfer circuit in which phase variations are induced by voltage fluctuations, temperature changes, aging of components as well as propagation delays induced by data transmission lines of unknown static length. It is therefore contemplated that the appended claims will cover any such modifications or embodiments that fall within the true scope of the invention.

What is claimed is:

1. Apparatus for synchronizing the transfer of a data signal from a remote data source through a clock-responsive logic gate to a local circuit in accordance with a local clock signal under conditions in which the remote data signal is shifted in phase with respect to the local clock signal comprising, in combination:

means for producing a remote clock signal which is phase shifted with respect to the local clock signal by an amount corresponding with the shift of the remote data signal relative to the local clock signal;

means for detecting a phase difference between the remote clock signal and the local clock signal; and, means for inverting the local clock signal and applying it to the clock input of said logic gate for a phase difference less than a predetermined value, and for buffering the local clock signal and applying the buffered clock signal to the clock input of said logic gate for a phase difference which exceeds a predetermined value.

2. Apparatus for compensating for a variable time delay in data being transmitted from a remote source to a local circuit comprising, in combination:

first means, comprising part of the local circuit, for generating a local clock signal;

second means at a remote location for outputting a remote data signal in response to the local clock signal;

a transmission conductor coupled to the remote circuitry for conducting a return clock signal to the local circuitry;

phase detector means, including first input means connected to receive the local clock signal and second input means connected to receive the return clock signal for producing an output in response to a phase difference between the local clock and return clock signals;

an integrator having an input connected to receive the output signal from said phase detector means and having an output proportional to the interval of the phase detector means output;

a threshold detector having an inverting input connected to the output of said integrator and having a noninverting input connected to a reference voltage node;

an exclusive-OR gate having a first input connected to the output of the threshold detector and having a second input connected to the local clock signal; and, a logic gate having a data input connected to receive the remote data signal and having a clock input connected to the output of the exclusive-OR gate.

3. A synchronous data transfer system comprising, in combination:

a master local oscillator for producing a local clock signal;

a local circuit having a clock terminal input and having a data terminal input for processing data in synchronous relation with the local clock signal;

a remote circuit having a clock terminal input and having a remote data output terminal for conducting a remote data signal in synchronous relation with a clock signal applied to said clock terminal;

a first signal data conductor connected between said master local oscillator and the clock terminal of said remote circuit;

a second signal conductor coupled to the remote data output terminal of said remote circuit and extending to said local circuit;

a third signal conductor coupled to the clock input terminal of said remote circuit and extending to said local circuit;

a retiming circuit having a data input connected to the second signal conductor for receiving the remote data signal and having a clock input terminal connected to the third signal conductor for receiving the return clock signal, and having a second clock input terminal connected to the master local oscillator for receiving the local clock signal;

said retiming circuit having phase-responsive switching means with first and second inputs coupled to receive the local clock and the return clock signals, said phase-responsive switching means having a logic high condition for a relative phase condition of the local clock relative to the return clock being less than a predetermined value, and having a logic low condition for a relative phase difference greater than said predetermined value;

an exclusive-OR gate having a first input coupled to receive the local gate signal and having a second input coupled to receive the output of the phase-responsive switching means; and, logic gate means having a clock input connected to receive the output of the exclusive-OR gate and having a data input terminal connected to receive the remote data signal.

4. A method of timing data output produced by a remote circuit with respect to a local master oscillator where the factors affecting the time delay of the remote data signal are variable comprising the steps:
generating a logic high value corresponding with a phase difference between a local clock and a return clock being less than a predetermined value and having a logic low condition corresponding with a phase difference between the local clock and the return clock being greater than a predetermined value;
inverting the local clock and applying the inverted local clock signal to the clock input of a control gate in response to the control signal having a logic high value; and,
buffering the local clock signal and applying it to the clock input of a remote data gate when the output assumes a logic low value.

5. A method for synchronizing the transfer of a data signal from a remote data source through a logic gate to a local circuit in accordance with a local clock signal under conditions in which the remote data signal is shifted in phase with respect to the local clock signal comprising the steps:
producing a remote clock signal which is phase shifted with respect to the local clock signal by an amount corresponding with the shift of the remote data signal relative to the local clock signal;
detecting a phase difference between the remote clock signal and the local clock signal;
inverting the local clock signal and applying to the clock input of said logic gate for a phase difference less than a predetermined value; and,
buffering the local clock signal and applying the buffered clock signal to the clock input of said logic gate for a phase difference which exceeds a predetermined value.

6. A method for compensating in the phase difference of data received from a remote source relative to a local clock comprising the steps of:
generating a local master clock signal;
applying the local master clock signal to a remote circuit;
receiving data from the remote circuit;
conducting the clock signal applied to the remote circuit to the local circuit;
detecting the phase difference between the local clock and the return clock;
gating the remote data as received at the local station with the inverted local clock if the phase difference is less than a predetermined value; and,
gating the remote data received at the local circuit with the local clock after the remote data has been shifted in phase relative to the local clock.

* * * * *